United States Patent [19]

Wilson

[11] Patent Number: 4,618,835
[45] Date of Patent: Oct. 21, 1986

[54] PROXIMITY SENSOR OSCILLATOR UTILIZING CONTROLLED CHARGE

[75] Inventor: Michael A. Wilson, Berthoud, Colo.

[73] Assignee: Maranantha Research Ltd., Franklin, W. Va.

[21] Appl. No.: 675,425

[22] Filed: Nov. 27, 1984

[51] Int. Cl.$^4$ ............................ G01V 3/11; H03B 5/12
[52] U.S. Cl. .................... 331/65; 331/117 R; 331/166; 324/327; 324/207; 324/236; 340/686
[58] Field of Search ............... 331/65, 117 R, 165, 331/166; 324/207, 236, 327; 340/686

[56] References Cited

U.S. PATENT DOCUMENTS

| 4,001,718 | 1/1977 | Wilson et al. | 331/65 |
| 4,068,189 | 1/1978 | Wilson | 331/65 |
| 4,267,522 | 5/1981 | Periot | 331/65 |
| 4,446,427 | 5/1984 | Lovrenich | 324/207 |

Primary Examiner—Siegfried H. Grimm
Attorney, Agent, or Firm—Robert E. Harris

[57] ABSTRACT

A proximity sensor oscillator is disclosed having controlled charge. The proximity sensor oscillator includes a resonant circuit which oscillates at a frequency determined by the components of the resonant circuit and with a power loss that is inversely related to the distance that a sensor element of the resonant circuit is to a conductive object. The peak amplitude of the resonant circuit varies with power loss and therefore measurement of this parameter provides an indication of the proximity of the conductive object to the sensor element. Power is provided to the resonant circuit by metering a fixed charge to the resonant circuit just before the peak of the resonant circuit voltage by means of a transistor switching circuit. By operating the oscillator within a range where power loss is inversely linearly proportional to the distance of the sensor element from a conductive object, the peak amplitude of the resonant circuit varies linearly with distance and hence, when detected, provides an indication of distance between the sensor element and the conductive object.

15 Claims, 2 Drawing Figures

PROXIMITY SENSOR OSCILLATOR UTILIZING CONTROLLED CHARGE

FIELD OF THE INVENTION

This invention provides an improved oscillator for a proximity detector, and, more particularly, provides an improved proximity detector oscillator utilizing controlled charge.

BACKGROUND OF THE INVENTION

Proximity sensors have been heretofore known and utilized, and such sensors have heretofore included a resonant circuit having an amplitude that varies in accordance with the distance between a conductive object and a probe sensor that is one element of the resonant circuit. A detector has also been heretofore utilized with such devices to provide an output that is based upon the detected amplitude and hence is indicative of distance.

Feedback oscillators of the Hartley or Colpitts types have been heretofore known in which the inductive coil of the LC resonant circuit have been utilized as the sensing element in a probe, but such oscillators have not proved to be completely satisfactory.

In addition, a linear oscillator for a proximity device has also been heretofore suggested (see U.S. Pat. No. 4,001,718). In this device, however, a power source is utilized that requires one of the power components (either voltage or current) to be fixed.

SUMMARY OF THE INVENTION

This invention provides an improved oscillator for a proximity sensing device that utilizes controlled charge and does not require that either power component be fixed. Instead, a fixed charge is periodically supplied to the resonant circuit of the oscillator.

It is therefore an object of this invention to provide an improved oscillator for a proximity sensing device.

It is another object of this invention to provide an improved oscillator for a proximity sensing device utilizing controlled charge.

It is still another object of this invention to provide an improved oscillator for a proximity sensing device wherein a fixed charge is periodically supplied to the resonant circuit of the oscillator.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
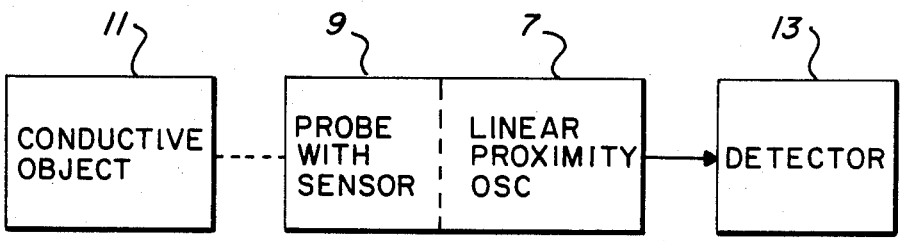
FIG. 1 is a block diagram of a typical proximity detecting device having a linear proximity oscillator according to this invention incorporated therein.

Proximity detecting device 5 is shown by the block diagram of FIG. 1. As shown, proximity detector device 5 includes a linear proximity oscillator 7, which oscillator includes a probe 9 having a sensor therein that is responsive to a conductive object 11, when such an object is sufficiently close to the sensor to cause a power loss in the resonant circuit of oscillator 7. As also indicated in FIG. 1, a conventional detector 13 is also commonly utilized to detect a parameter (commonly peak amplitude) of the oscillator, and this detected signal provides an indication of the distance of the conductive object from the sensor.

As is well known, the power loss of a resonant circuit of a proximity sensor oscillator varies inversely with the distance that a conductive object is from the sensor element of the resonant circuit. Thus, as this distance decreases, the power loss increases. The power loss of the resonant circuit causes the circuit to have a peak amplitude that varies with power loss variations, and therefore, by measuring the peak amplitude, an indication can be provided of the distance of a conductive element causing the power loss from the sensor element. In addition, over the operating range where the inverse of the power loss has a linear variation with distance, the peak amplitude of the oscillating component varies linearly with distance, and a detecting circuit responsive to the amplitude of the oscillating component thus provides an indication of distance.

In order for proximity sensor oscillator 7 to oscillate, it is necessary that the resonant circuit be periodically powered. A linear oscillator for a proximity sensing device is shown in U.S. Pat. No. 4,001,718, with this oscillator requiring that power be supplied that has either a fixed voltage or a fixed current. A more complete explanation of such a proximity detector oscillator is set forth in U.S. Pat. No. 4,001,718, and this patent is therefore incorporated herein by reference.

In the device shown in U.S. Pat. No. 4,001,718, the power source switched across the resonant circuit is required to have one power component (either voltage or current) that is fixed. In this invention, however, a charge is periodically supplied to the resonant circuit and neither the voltage nor the current need be fixed.

Figure 2:
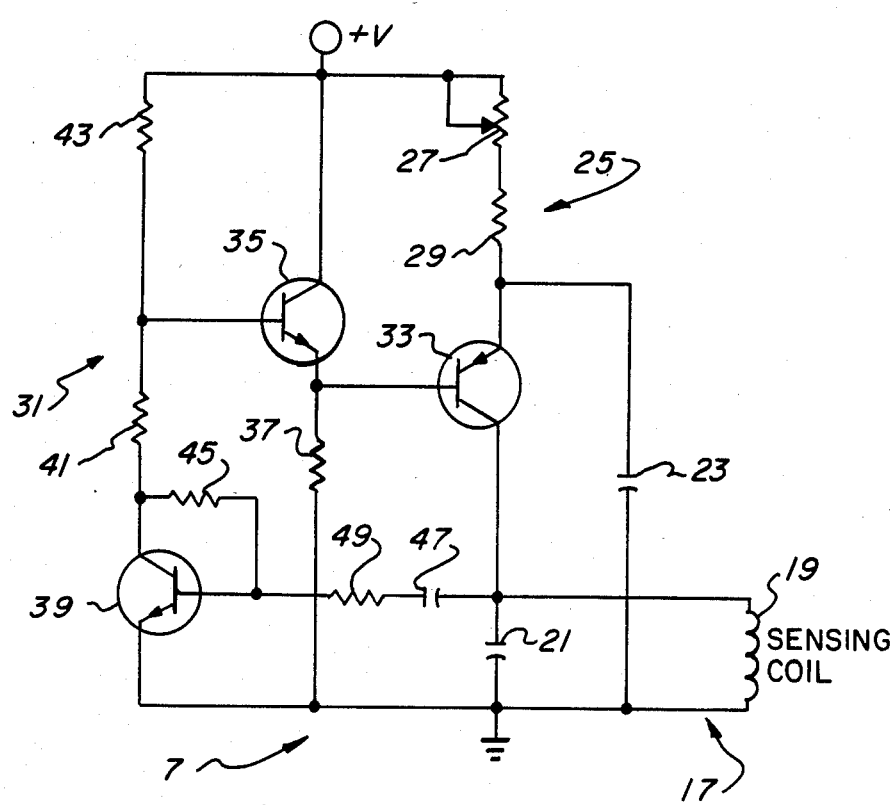
FIG. 2 is an electrical schematic diagram of the proximity sensor oscillator of this invention.

Proximity sensor oscillator 7 of this invention is shown in FIG. 2. As shown, resonant circuit 17 includes inductor 19 and capacitor 21 with inductor 19 providing a sensing element (or coil) which may be positioned at the detector probe (as indicated in FIG. 1). The frequency of resonant circuit 17 is determined by the values of the inductive and capacitive components, as is well known, for use in proximity sensing devices.

A controlled charge device, shown in FIG. 2 as capacitor 23, is connected at one side to ground, as is one side of resonant circuit 17.

A charge metering system 25 is provided by series connected variable resistor 27 and resistor 29, with the charge metering system being connected between the non-ground side of capacitor 23 and a power source (+V).

A switching circuit 31 is provided to periodically meter the fixed charge at the controlled charge device (capacitor 23) to resonant circuit 17. As shown, switching circuitry 31 includes transistor 33, the emitter of which is connected to the junction of capacitor 23 and charge metering system 25, the collector of which is connected to the non-ground side of resonant circuit 17, and the base of which is connected to the emitter of transistor 35 and to ground through resistor 37. Transistor 35 has its emitter also connected with ground through resistor 37, its collector connected with the power source (+V), and its base connected with the collector of transistor 39 through resistor 41 and with the power source (+V) through resistor 43. Transistor 39 has its emitter connected with ground, and its base and collector connected to one another through resistor 45. In addition, positive feedback is provided to the base of transistor 39 through series connected capacitor 47 and resistor 49.

In operation, transistor 33 comes on just before the peak of the resonant circuit (tank) voltage. Transistor 33 is turned on by lowering the base voltage of transistor 35. Positive feedback through capacitor 47 and resistor 49 carries transistor 39 all the way to saturation. When transistor 39 is saturated, the base voltage of transistor 35 is fixed at approximately two-thirds that of the power supply. Under this condition, transistor 33 is turned on to a current level limited only by resistor 37 and the beta of the transistor, and the charge on capacitor 23 is discharged into resonant circuit 17 at a very high rate.

When the emitter voltage of transistor 33 approaches the base voltage of transistor 35, transistor 35 begins to take base current from transistor 33. When the two voltages are equal, the current through transistor 33 falls to a very small value, which value is too low to maintain transistor 39 in saturation, and the three transistors rapidly turn off.

When the three transistors are off, the resonant circuit oscillates freely, and capacitor 23 is also charged along an exponential curve because of resistors 27 and 29. Since the tank circuit frequency is substantially fixed, the time allowed for charging capacitor 23 is substantially fixed and this results in the charge metered into capacitor 23 being also substantially fixed, and thus the charge dumped into the resonant circuit, when the transistors turn on, is substantially fixed. This results in a temperature stable linear proximity oscillator that is an improved oscillator that does not require power to be supplied using a power component that is a fixed voltage or a fixed current.

In view of the foregoing, it should be appreciated that this invention provides an improved proximity sensor oscillator utilizing controlled charge.

What is claimed is:

1. A proximity oscillator device, comprising:
 a continuously oscillating resonant circuit one element of which provides a sensor that is responsive to a conductive object such that the distance therebetween has an inverse effect on the power loss of said resonant circuit;
 controlled charge means connectable with a power supply and with said resonant circuit, said controlled charge means, when discharged, providing a substantially constant metered charge; and
 switching means connected between said controlled charge means and said resonant circuit to effect periodic discharge of said substantially constant metered charge from said controlled charge means to said resonant circuit with at least one measurable parameter of said power loss of said resonant circuit being substantially uneffected by said supplied charge so that said parameter provides an indication of the proximity to said sensor of a conductive object causing said power loss of said resonant circuit.

2. The proximity oscillator device of claim 1 wherein said device further includes a charge metering system connected between a power source and said controlled charge means.

3. The proximity oscillator device of claim 2 wherein said charge metering system includes resistance means.

4. The proximity oscillator device of claim 1 wherein said resonant circuit includes an inductor and a capacitor connected in parallel with one another, with said inductor being said sensor.

5. The proximity oscillator device of claim 1 wherein said controlled charge means is a capacitor.

6. The proximity oscillator device of claim 1 wherein said switching means includes a plurality of transistors one of which is connected between said controlled charge means and said resonant circuit to control discharge of said charge from said controlled charge means to said resonant circuit.

7. The proximity oscillator device of claim 6 wherein said switching means includes three operationally interconnected transistors.

8. In an oscillator having a continuously oscillating resonant circuit wherein the effective impedance and Q, and thus power loss at resonance, is a function of a distance of one element of the resonant circuit from a conductive object, an improvement comprising:
 controlled charge means connectable with a power supply and with said resonant circuit, said controlled charge means, when providing an output, provides a substantially fixed charge as said output; and
 switching means for periodically switching said controlled charge means across said resonant circuit to thereby repeatedly meter said fixed charge across said resonant circuit with said fixed charge being supplied to said resonant circuit near the peak of the resonant circuit voltage.

9. The improvement of claim 8 wherein said controlled charge means is a capacitor.

10. The improvement of claim 9 wherein said oscillator includes a charge metering system connected to a power source, and wherein said charge metering system is connected to said capacitor to charge the same.

11. The improvement of claim 8 wherein said resonant circuit includes an inductor and a capacitor connected in parallel with one another.

12. The improvement of claim 8 wherein said switching means includes a plurality of transistors one of which controls discharge of said controlled charge means across said resonant circuit, and the others of which are operationally interconnected with said one transistor to control operation thereof.

13. A linear proximity oscillator device, comprising:
 a resonant circuit including a capacitor and an inductor with said inductor providing a sensor that is responsive to a conductive object such that the distance therebetween has a linear inverse effect on the power loss of said resonant circuit within predetermined limits;
 a charge metering system including resistance means connected with a power source;
 controlled charge means including a capacitor connected with said resistance means; and
 switching means including first, second and third transistors, with said first transistor having its emitter connected with said resistance means and said controlled charge means and its collector connected with said resonant circuit, with said second transistor having its emitter connected with the base of said first transistor and its base connected with the collector of said third transistor, and with said third transistor having its base connected with the collector of said first transistor through positive feedback means.

14. The oscillator of claim 13 wherein said resistance means includes variable resistance means.

15. The oscillator of claim 13 wherein said positive feedback means includes a resistor and a capacitor connected in series with one another.

* * * * *